United States Patent [19]
Stark

[11] Patent Number: 5,918,870
[45] Date of Patent: Jul. 6, 1999

[54] CLAMPING DEVICE FOR CLAMPING A QUICK-CLAMP CYLINDER ON A SUPPORT PLATE FOR PROCESSING MACHINES

[76] Inventor: Emil Stark, Kommingerstrasse 48, A-6840 Gotzis, Austria

[21] Appl. No.: 08/926,228

[22] Filed: Sep. 9, 1997

[30] Foreign Application Priority Data

Sep. 9, 1996 [DE] Germany ............ 296 15 613 U

[51] Int. Cl.⁶ .................................................. B23Q 3/00
[52] U.S. Cl. ............................................ 269/309; 269/310
[58] Field of Search ............................ 269/309, 310, 269/900, 56; 29/559, 563, 464, 33 R, 271; 33/180 R; 198/345

[56] References Cited

U.S. PATENT DOCUMENTS

| | | | |
|---|---|---|---|
| 3,312,510 | 4/1967 | Brehem | 269/309 |
| 4,577,847 | 3/1986 | Schedwin | 269/309 |
| 4,636,135 | 1/1987 | Bancon . | |
| 4,906,123 | 3/1990 | Weskamp et al. . | |
| 5,190,272 | 3/1993 | Zika et al. | 269/309 |
| 5,415,384 | 5/1995 | Obrist et al. | 269/309 |

FOREIGN PATENT DOCUMENTS

| | | |
|---|---|---|
| 0 125 220 A2 | 4/1984 | European Pat. Off. . |
| 0 282 417 A1 | 3/1988 | European Pat. Off. . |
| 30 25 157 A1 | 7/1980 | Germany . |
| 41 35 418 A1 | 10/1991 | Germany . |
| 43 07 342 A1 | 3/1993 | Germany . |

*Primary Examiner*—Timothy V. Eley
*Assistant Examiner*—Lee Wilson

[57] ABSTRACT

Device for detachable fastening of workpieces to be machined on a processing machine having a pallet on which the workpieces are detachably fastened, and which can be connected detachably via this pallet to the processing machine, wherein the locking between the pallet and one or more quick-clamp cylinders is effected through at least one pull-in bolt which are fastened on the pallet and which engage in clamping manner in corresponding receptacles on the quick-clamp cylinder, and wherein the clamping connection is maintained through tension springs, and for unlocking a hydraulic piston can be actuated which overcomes the clamping force of the tension springs, wherein in the quick-clamp cylinder the space between the central pull-in bolt and the tension springs arranged to the side of the latter is sealed.

12 Claims, 10 Drawing Sheets

CLAMPING DEVICE FOR CLAMPING A QUICK-CLAMP CYLINDER ON A SUPPORT PLATE FOR PROCESSING MACHINES

BACKGROUND OF THE INVENTION

1. Field of the Invention

The subject of the present invention is a clamping device for clamping parts together.

2. Description of the Prior Art

In the invention according to DE 41 35 418 A1 assigned to the same applicant there was the disadvantage that the base of the clamping device was screwed down with screws extending from the underside to the upper side, which made it difficult to dismantle the whole device. The entire cylinder always had to be disassembled in order to carry out adjustments or maintenance.

Moreover, this type of construction could not or only with very great effort be integrated directly into a bench or a die. The complete clamping cylinder always had to be inserted.

In devices of the type according to DE 41 35 418 A1 there is the danger that swarf penetrates from above and above all enters the ball bearing cage.

A further disadvantage of this previously known device is that in the region between the central piston and the lateral chambers for receiving the tension spring there is a connecting passage resulting in the admission of water which accumulates in the tension spring chamber and causes damage.

Furthermore, this water fills the cavity which as a result is no longer compressible so that the effect of the tension springs is nullified.

SUMMARY OF THE INVENTION

According to the invention, a quick-clamp cylinder of the type mentioned is substantially easier to dismantle, can be better integrated and is moreover protected against the admission of water.

To solve the task set, the invention is characterised by the characteristics of claim 1 such that the chamber between the central pull-in bolt and the laterally adjoining tension springs is now sealed according to the invention by a centrally fitted sealing ring which is fixed against upward axial displacement by a Seeger lock washer and which moreover abuts against the cover with lateral O-rings and is supported by a vertical, downwardly directed leg and a further O-ring against the piston.

Of course all other means of sealing fulfilling the same sealing purpose are also claimed in the scope of the present invention, such as for example a lip seal or O-ring seal in all arrangements possible in the specified construction of quick-clamp cylinders.

It is furthermore of importance that the cover is supported by its downwardly oriented leg against a likewise available O-ring and that as a result a sealing effect is achieved.

Thus from the central bore to the laterally adjoining bore there is a sealing connection which is achieved by the sealing ring and the associated O-rings as well as by the leg which with the sealing ring brings about this sealing action.

A further essential advantage of the present invention is now found in that the screw for fastening the cover is now screwed from above into the lower part of the quick-clamp cylinder thereby facilitating disassembly.

That is to say that these screws would previously have to be loosened, as a result of which the entire disk would be raised under the force of the plate springs and thus make it necessary to carry out a difficult refit of the device.

According to the invention this fitting need no longer be performed for the pull-in bolts are now withdrawn upwardly as a result of which the Seeger lock washer is freed so that this Seeger circlip ring can now be withdrawn and then the entire sealing ring can likewise be withdrawn as a result of which the ball bearing cage is then freely accessible and can be taken out from above and cleaned. There are therefore considerable advantages in the ready ability to dismantle this device by comparison with the device according to DE 41 35 418 A1.

The screws virtually need no longer to be undone and there is no longer the risk that the tension springs, which are preferably constructed as plate springs, push the entire disk out upwardly.

Moreover, it is possible to blow air into the cavity of the central bore from above and easily remove swarf which has penetrated there by a blast of air. This was not possible in the device according to DE 41 35 418 A1 due to the sealing of all of the hollow spaces.

The whole arrangement is thus more readily accessible and the ball bearing cage can also be readily cleaned by blowing air in without dismantling the device.

In addition installation in a bench or a corner is now readily possible. For this purpose the lower half of the quick-clamp cylinder is built in the bench or corner, the cover simply placed on top and secured with the aforementioned screws. All the functions which were hitherto performed by this lower half are now directly integrated into the bench which serves as the cylinder. Leak-proofing problems, as in the installation of the cylinder up to now, do not arise.

As a result of the compact construction it is moreover possible to increase the pulling power. This was previously achieved through the tension springs alone but now additionally pressurisation of the hydraulic cylinder required hitherto only for unlocking can take place in such a way that the latter is additionally pushed downwards.

A secondary aspect of the present application is the special design of the ball bearing cage which is used in the clamping cylinder according to the invention. So far ball bearing cages have been used which have simply accommodated the bearings loosely. On removal of the ball bearing cage the bearings could fall out of the latter and had to be reinserted. The invention now proposes that the freedom of movement of the bearings be limited with respect to the cage. On the outside a flange is provided and a limit stop on the inside. This limit stop is produced in that the bore provided for each ball bearing does not pass completely through the cage but rather only to a certain depth. Lugs are then formed which prevent the ball bearings falling out.

Special types of pull-in nipple are further proposed in association with the device according to the invention. A first type provides for the pull-in nipple to be fastened with a threaded rod. This threaded rod is fastened at the other end in a thrust bearing, in a pallet or directly to the workpiece to be machined. In a different type it is provided for the nipple to be fastened from the front with a through screw. Should the nipple break it is still held by the screw. In a third form of construction it is provided for the tip of the nipple to be manufactured from a special material.

Characteristics of these three structural types can also be combined.

The subject matter of the present invention does not just result from the subject matter of the individual claims but also from combination of the individual claims with one another.

All information and characteristics disclosed in the documents including the abstract and especially the three-dimensional construction shown in the drawings are claimed as essential to the invention insofar as they are novel individually or in combination with respect to the state of the art.

BRIEF DESCRIPTION OF THE DRAWINGS

The invention is explained below in more detail with reference to drawings illustrating several ways of implementing it. In doing so further characteristics essential to the invention and advantages of the invention emerge from the drawings and their description.

DESCRIPTION OF THE PREFERRED EMBODIMENTS

Figure 1:
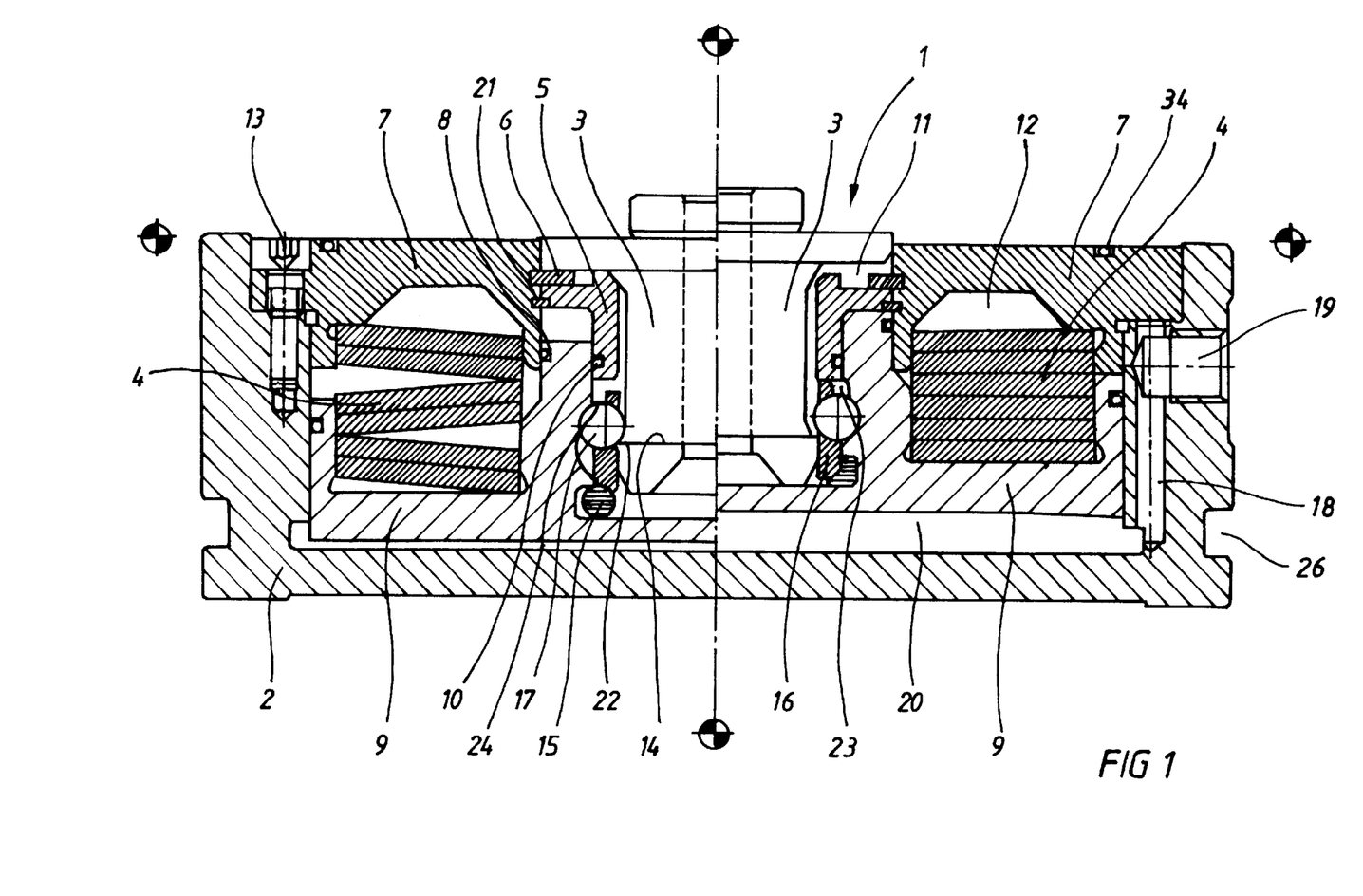
FIG. 1 is a section through a quick-clamp cylinder without pallet fitting in the clamped and unclamped state.
Figure 3:
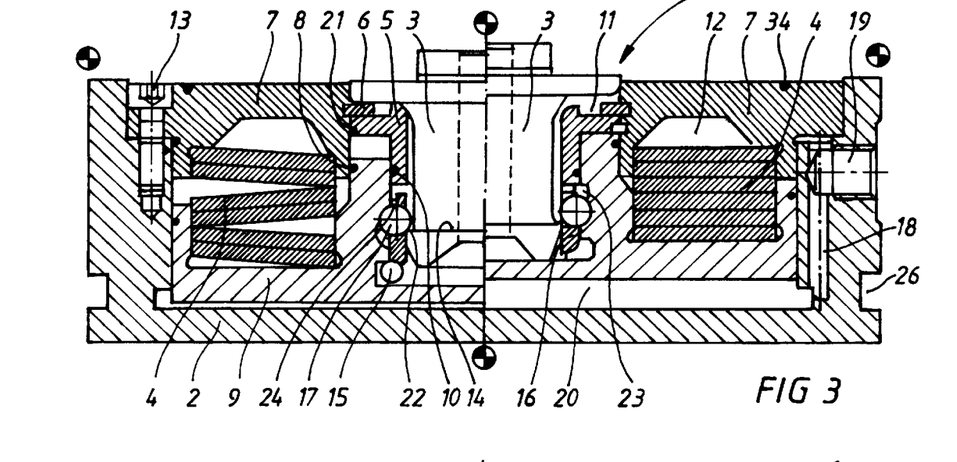
FIG. 3 is a section through the quick-clamp cylinder without pallet fitting in the clamped and unclamped state.

In FIGS. 1 and 3 a clamped and unclamped quick-clamp cylinder 1 is illustrated with the respective clamping device without the pallet disclosed according to DE 41 35 418 A1 which can be locked to that in the quick-clamp cylinder 1.

The clamping device consists in this case essentially of tension springs 4 which surround the pull-in bolt in question concentrically, and of an axially displaceable hydraulic piston 9.

The quick-clamp cylinder 1 furthermore has a cover 7 which is screwed on to the lower part 2 of the quick-clamp cylinder 1 by means of screws 13 due to which the quick-clamp cylinder 1 can be readily dismantled.

From FIGS. 1 and 3 it can further be seen that in the quick-clamp cylinder 1 the hollow space of the central bore 11 containing the pull-in bolt 3 is sealed from the hollow space of the undercut 12 containing the tension springs 4 preferably constructed as plate tension springs by a sealing ring 5 inserted in the quick-clamp cylinder 1 in such a way that no liquid can get into the space of the tension springs 4 as a result of which damage to the springs is prevented and additionally troublefree operation of the springs is ensured.

For this purpose the central sealing ring 5 inserted in the quick-clamp cylinder 1 is protected upwardly against axial displacement by a Seeger lock washer 6 which can be removed from the device and furthermore has a Seeger lock washer 21 which cannot be removed from the quick-clamp cylinder 1 arranged to the side on the vertically, downwardly oriented leg of the cover 7 and is in addition supported by its vertically, downwardly oriented leg with a further O-ring 10 on the hydraulic piston 9.

An additional sealing effect in the cover-piston region 7, 9 is achieved in that the cover 7 is supported by its downwardly oriented leg against an O-ring 8 arranged on the hydraulic piston 9.

On account of the arrangement and construction of the sealing ring 5 described above working together with the advantageous leg construction of the cover 7 the perfect, liquid-impermeable sealing of the central bore 11 from the undercut 12 with the tension springs 4 is ensured in the quick-clamp cylinder 1 with the advantages already described.

In addition air can be blown into the hollow space of the central bore 11 from above and as a result easily remove swarf which has penetrated there. This is not possible in the clamping device disclosed by DE 41 35 418 A1.

FIGS. 1 and 3 further show that a ball bearing cage 16 supported on the hydraulic piston 9 by an O-ring 15 is provided with ball bearings 17 each resting in a groove 22, 23 of the pull-in bolt 3 and the hydraulic piston 9.

In this case the ball bearing cage 16 has an annular space 24 in which a plurality of the ball bearings 17 distributed at the periphery are arranged.

In the clamped position (according to FIG. 1, on the left) the ball bearings 17 are in engagement with the annular groove 22 arranged in the outer perimeter of the pull-in bolt 3. At the same time the ball bearings 17 are located with part of their outer perimeter in a bevel in the region of the annular groove 23 in the hydraulic piston 9.

Thus after the hydraulic piston 9 is pushed down by the strong spring force of the tension springs 4 the ball bearings 17 are carried along too through the bevels and press the ball bearing cage 16 against an elastomeric O-ring 15. The ball bearing cage 16 is always held in a particular, defined position by the elastomeric O-ring 15.

It can further be seen from FIGS. 1 and 3 that for unlocking the entire arrangement the pressure chamber 20 underneath the hydraulic piston 9 is acted on by hydraulic oil introduced into the quick-clamp cylinder 1 through an oil feed arrangement 19 and reaching the pressure chamber 20 through a feed pipe 18 as a result of which the hydraulic piston moves upwards, In doing so the O-ring 15 first tautens and pushes the ball bearing cage 16 upwards. On further upward displacement of the hydraulic piston 9 the ball bearings 17 reach the region of the radially outwardly arranged annular groove 23 of the hydraulic piston 9 as a result of which they simultaneously come out of engagement with the radially inwardly arranged annular groove 22 of the pull-in bolt 3. With that the pull-in bolt 3 is unlocked against the elastic force of the tension springs 4.

For locking, the pull-in bolt 3, insofar as it is not yet inserted in the central bore 11, is introduced. Subsequently the pressure in the hydraulic system is reduced so that the tension springs push the hydraulic piston 9 back down. The ball bearings 17 again engage in the annular groove 22 on the pull-in bolt 3 and the latter is carried along downwards and locked.

In the event of failure of the hydraulic feed, automatic locking of the pull-in bolt 3 ensues through the described clamping device.

Instead of the plate tension spring 4 described in the embodiment it is of course also possible to employ other types of tension springs, such as eg coil springs.

Naturally the tension spring can also be constructed as an elastomeric ring, for example from Vulkulan.

In doing so the only matter of importance is always that the previously described tension spring applies the required elastic force to the pull-in bolt 3.

Instead of the sealing ring 5 it is also possible of course to use a different means of sealing fulfilling the same sealing purpose, such as eg a lip seal or an O-ring seal, in a different arrangement. In doing so the only matter of importance is always that the sealing means ensures the advantageous sealing according to the invention between the pull-in bolt 3 and the tension springs 4.

It is further shown in FIG. 1 that the pull-in bolt 3 is constructed with an annular flange 14.

Figure 2:
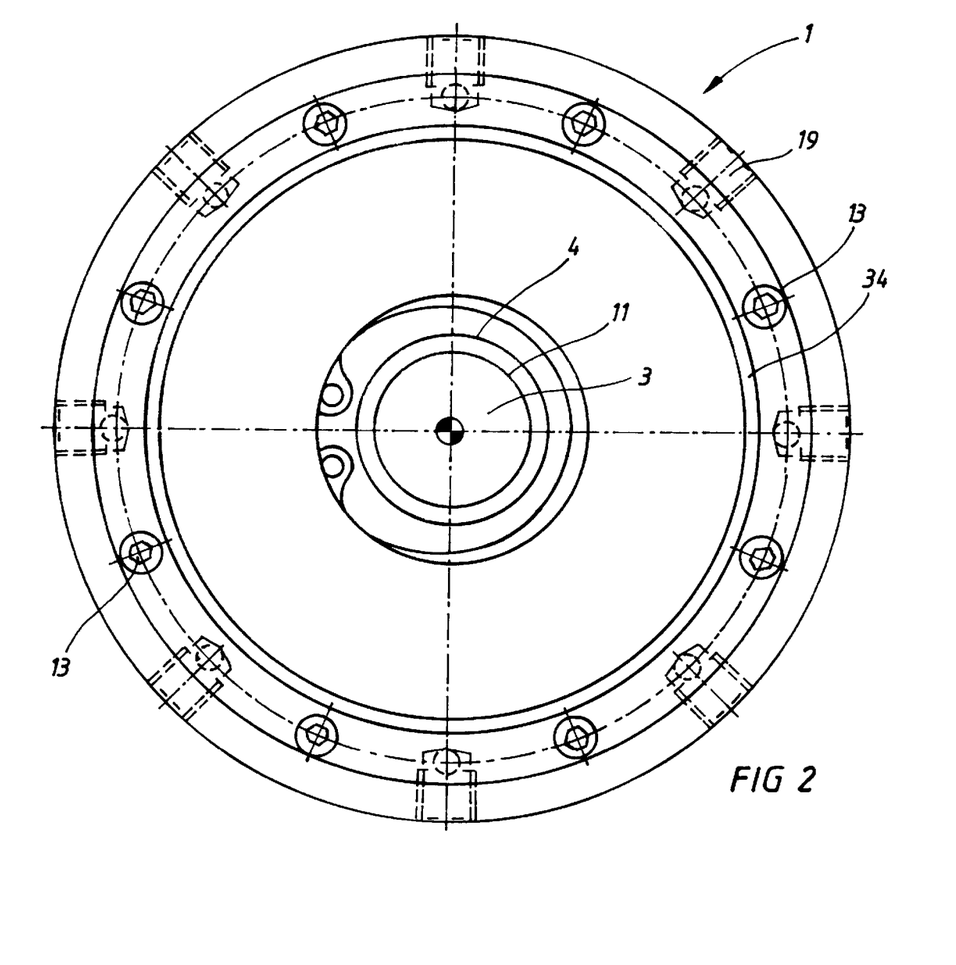
FIG. 2 is a plan view of the quick-clamp cylinder without pallet fitting with a pull-in bolt and spring arrangement.

FIG. 2 shows the quick-clamp cylinder 1 in plan view with the pull-in bolt and tension spring clamping device 3, 4 according to the invention and with the fastening screws 13.

The quick-clamp cylinder 1 is fastened via clips which are not shown but engage in the circumferential groove 26 and are fixed in suitable manner.

To increase the pull-in force a further hydraulic line (not illustrated) can open out into the free space 12 and selectively apply pressure to it. The force produced supports the tension springs 4 so that overall the pull-in force is increased. Of course there must be a corresponding design for the screws 13 as well as for the sealing elements. This increase can also be employed in the other embodiments illustrated.

FIGS. 4–7 show essentially similar illustrations of other embodiments. To simplify illustration only the essential components are provided with reference numbers as well as those which diverge from those in FIGS. 1–3. The basic structure is essentially identical.

Figure 4:
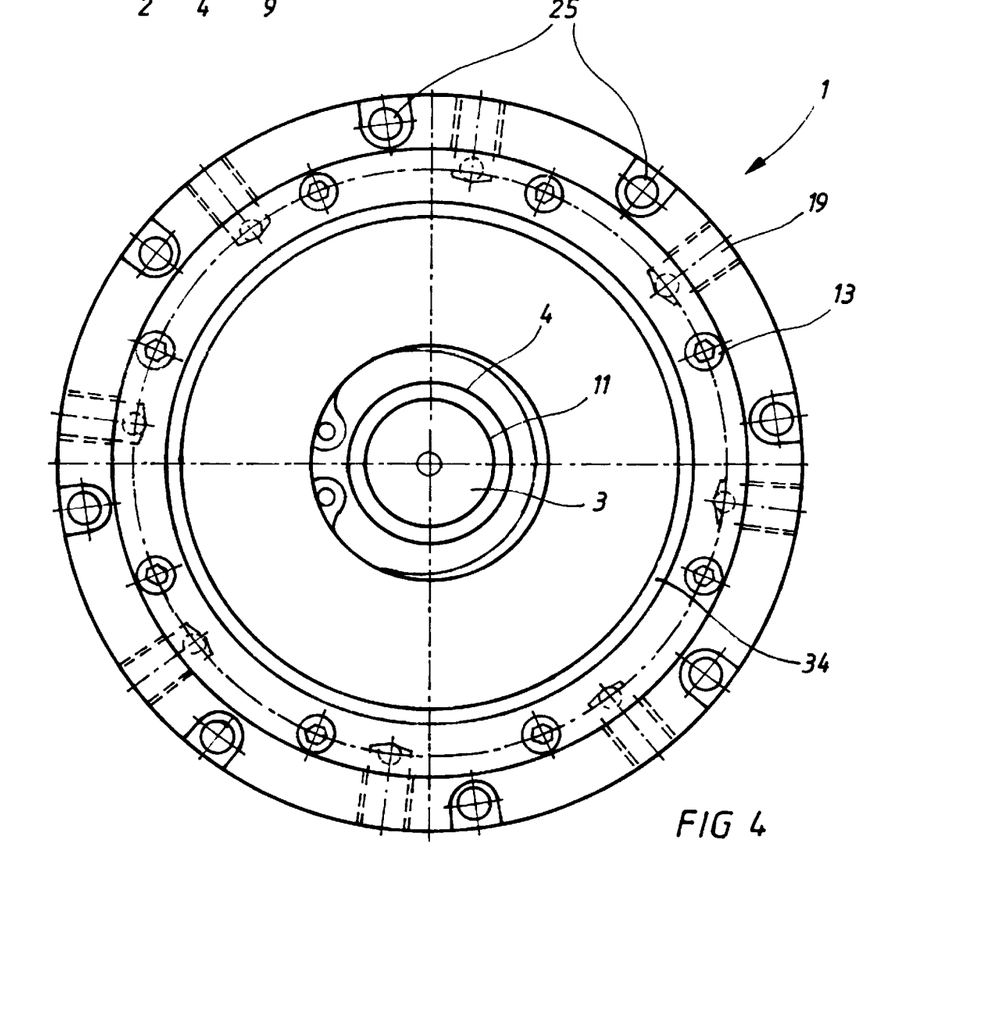
FIGS. 4 and 5 are similar to FIGS. 2 and 3 but showing a second embodiment in accordance with FIGS. 2 and 3.
Figure 5:
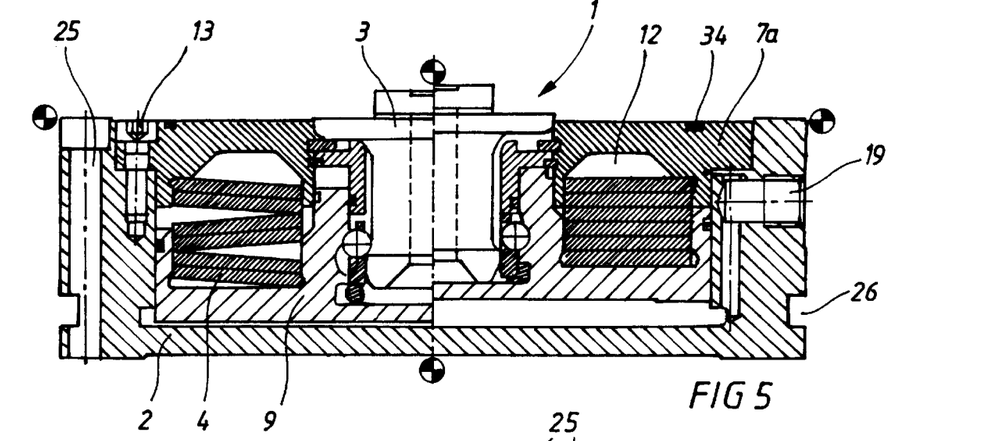

In FIGS. 4 and 5 a different type of fastening is illustrated. At the outer perimeter several through-holes 25 can clearly be seen with which the entire quick-clamp cylinder 1 can be fastened. Here either a special cover 7a or the cover 7 used so far can be used.

Figure 6:
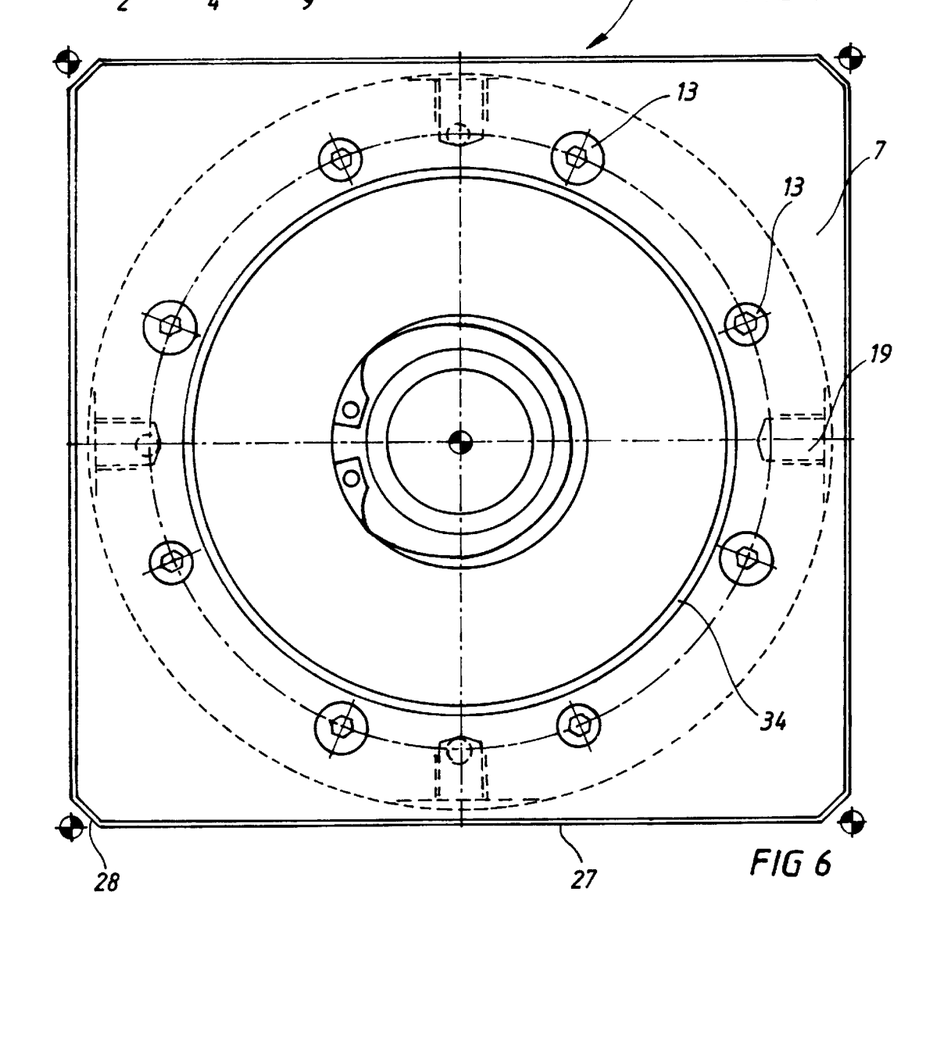
FIGS. 6 and 7 is a view in each case of a third embodiment in accordance with FIGS. 2 and 3.
Figure 7:
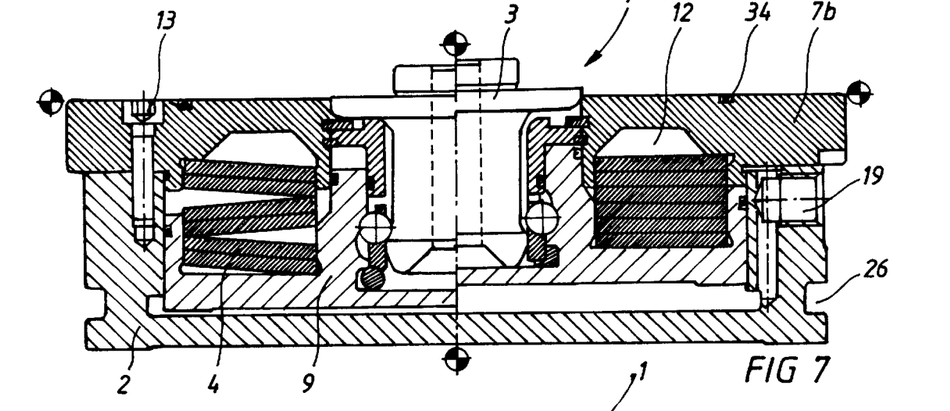

In FIGS. 6 and 7 a different cover 7b is used. This is of essentially square construction. This shape of cover has the advantage that now a single quick-clamp cylinder 1 can also be used for the positionally correct fixing of a workpiece or a pallet. For this purpose the side edges 27 and/or chamfers 28 serve as limit stop for suitable elements, eg pegs. By working together in this way fixing secured against twisting is produced.

It is net obligatory for the cover 7b to have a square construction. A polygonal construction also comes into consideration, eg an octagon or a rectangle. The cover 7b also need not as illustrated project laterally over the lower part 2 so that fastening according to FIGS. 4 and 5 is also possible.

Figure 8:
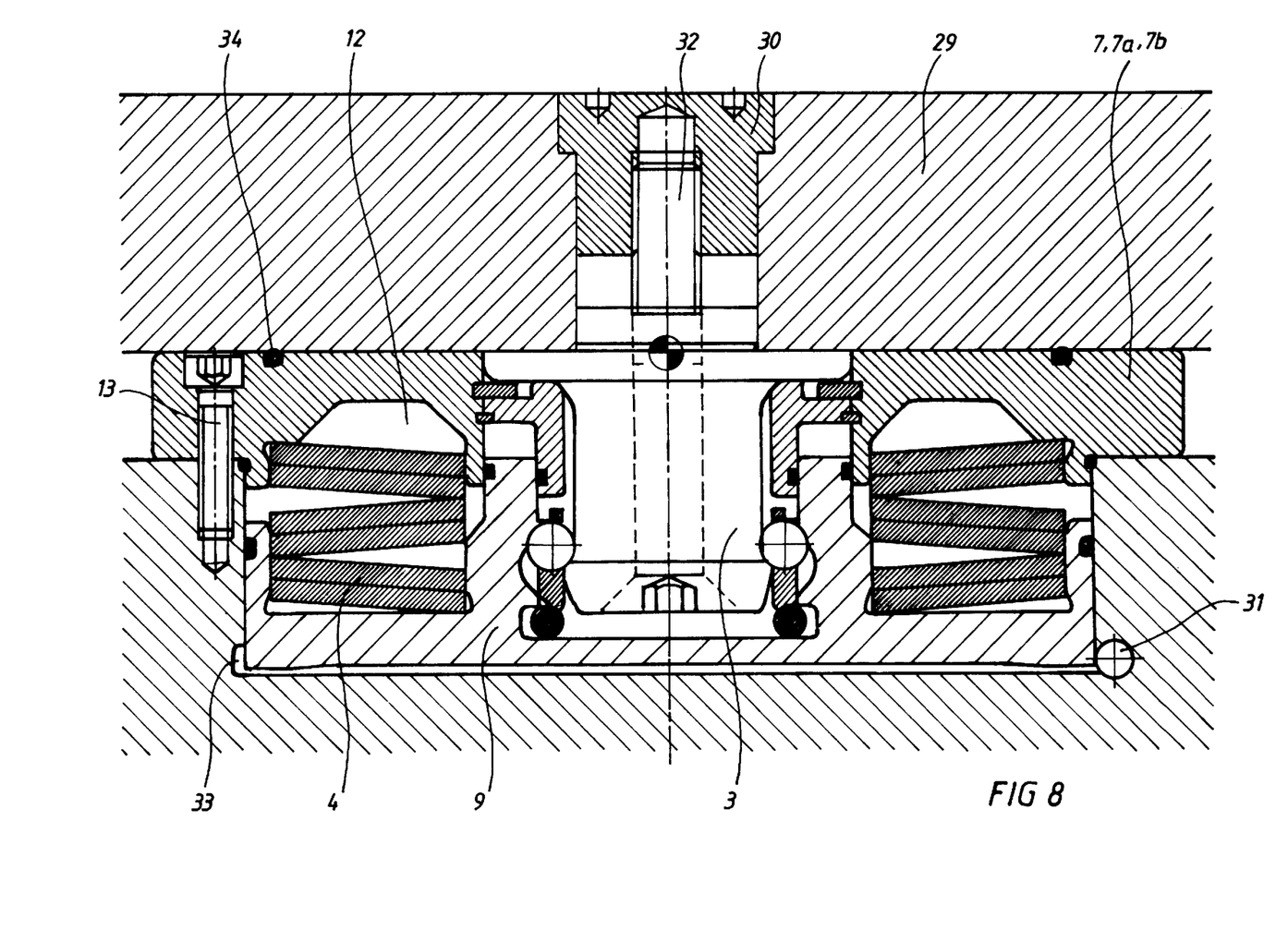
FIG. 8 is a cross section through an integrated quick-clamp cylinder.

FIG. 8 shows an embodiment in which the quick-clamp cylinder is directly integrated, eg in a bench. The lower part 2 can be dispensed with completely. In the embodiment shown every type of cover 7, 7a, 7b already described can be used. It is further illustrated that the pull-in bolt 3 is fastened in a pallet 29 by means of a countersupport 30 and a through-screw 32. A more exact illustration of possible types of fastening is provided in FIGS. 12–17.

The supply of hydraulic fluid ensues via a bore 31 which preferably leads into a circumferential annular groove 33. This annular groove 33 ensures good distribution of the hydraulic fluid over the entire circumference of the hydraulic piston 9.

In all the embodiments shown the cover 7, 7a, 7b is provided on its upper side with a damping element 34, eg an O-ring.

Figure 9:
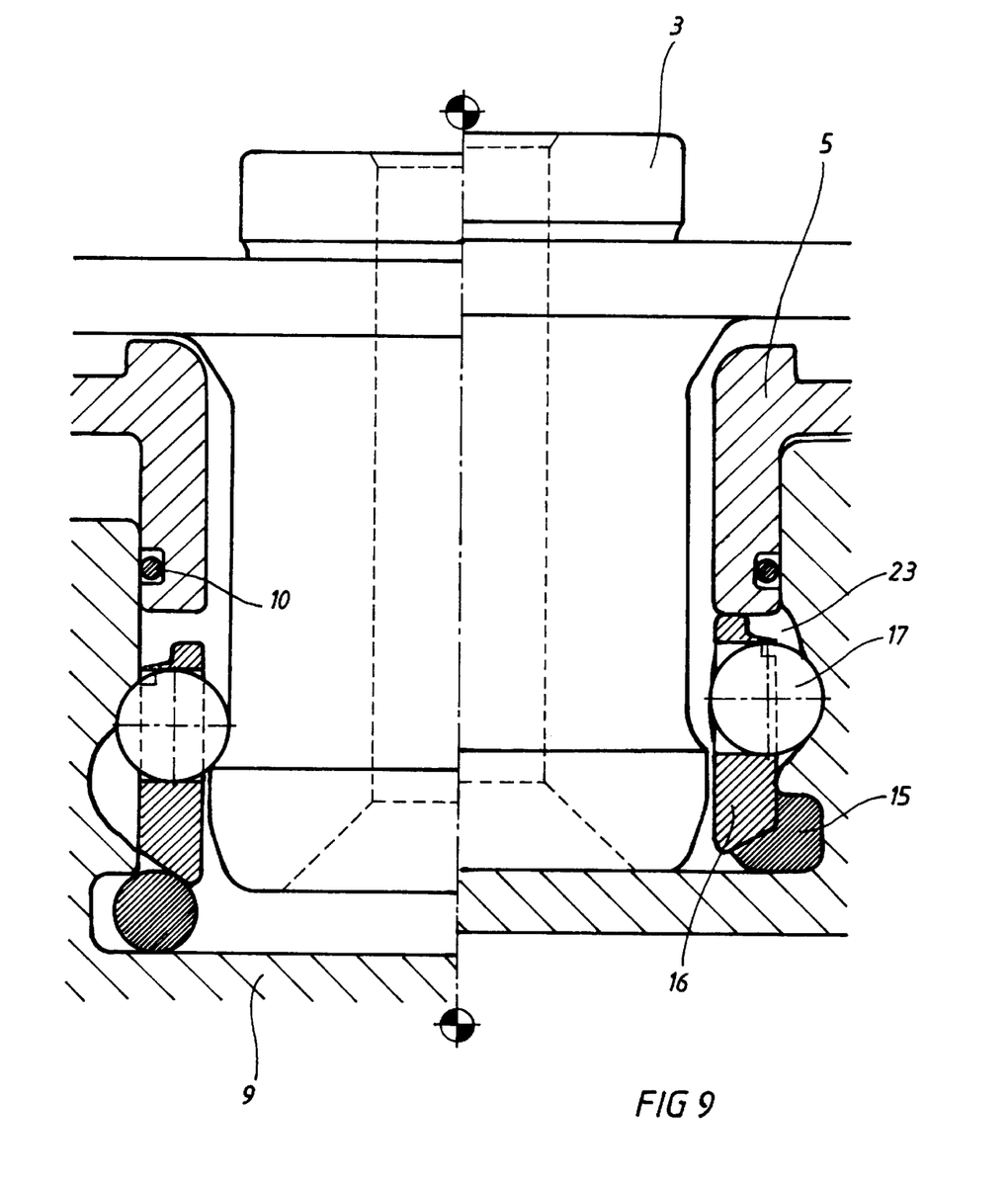
FIG. 9 is an enlarged illustration of the nipple in the clamped and unclamped state.

FIG. 9 shows an enlarged illustration of the pull-in bolt 3 together with details of the hydraulic cylinder 9. As in FIG. 1 the clamped state is shown on the left and the unclamped state on the right. The deformation of the O-ring 15 can be clearly recognised and details of the ball bearing cage 16 are also illustrated more clearly.

Figure 10:
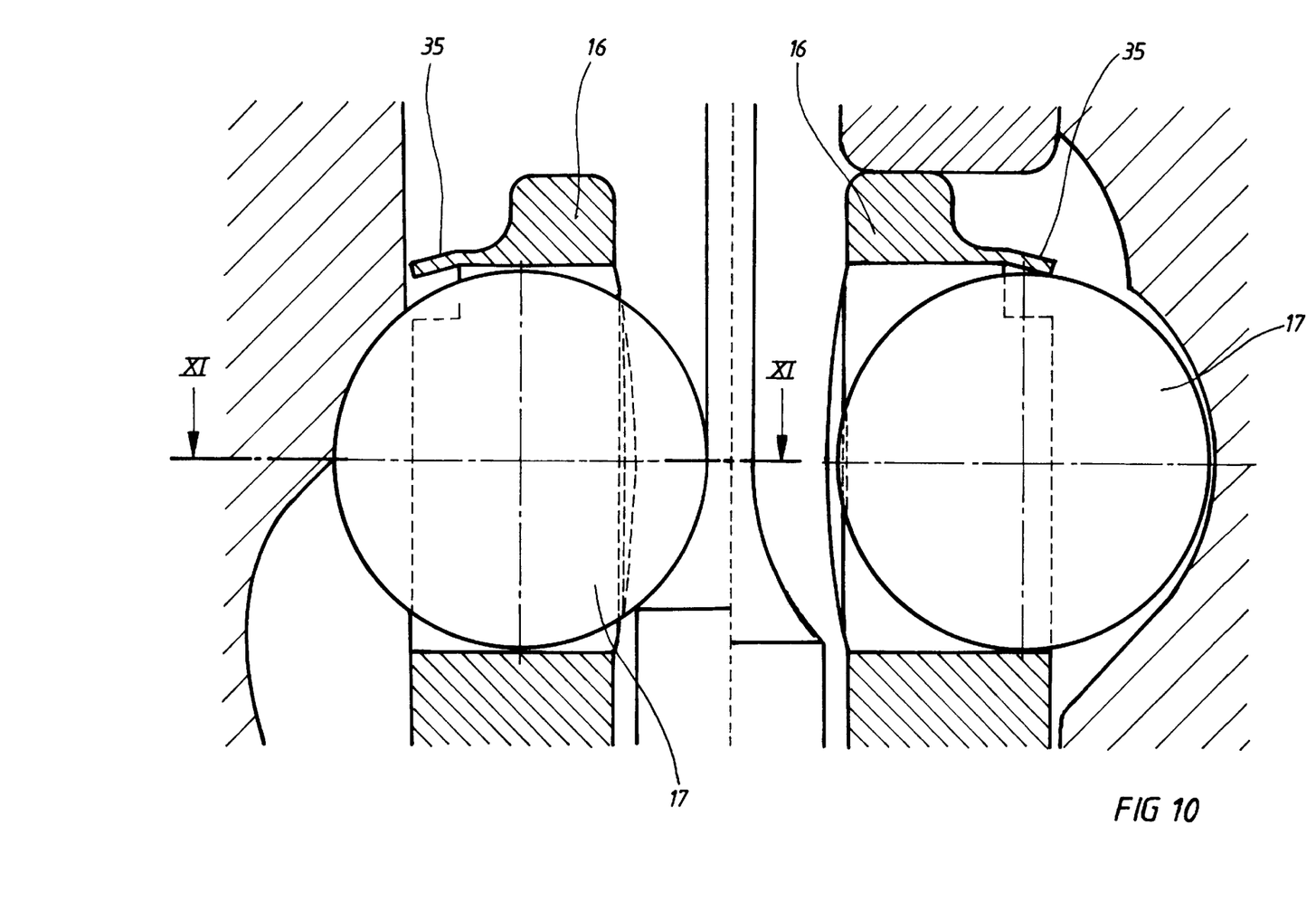
FIG. 10 is an enlarged illustration of a detail of the ball bearing cage in the clamped and unclamped state.
Figure 11:
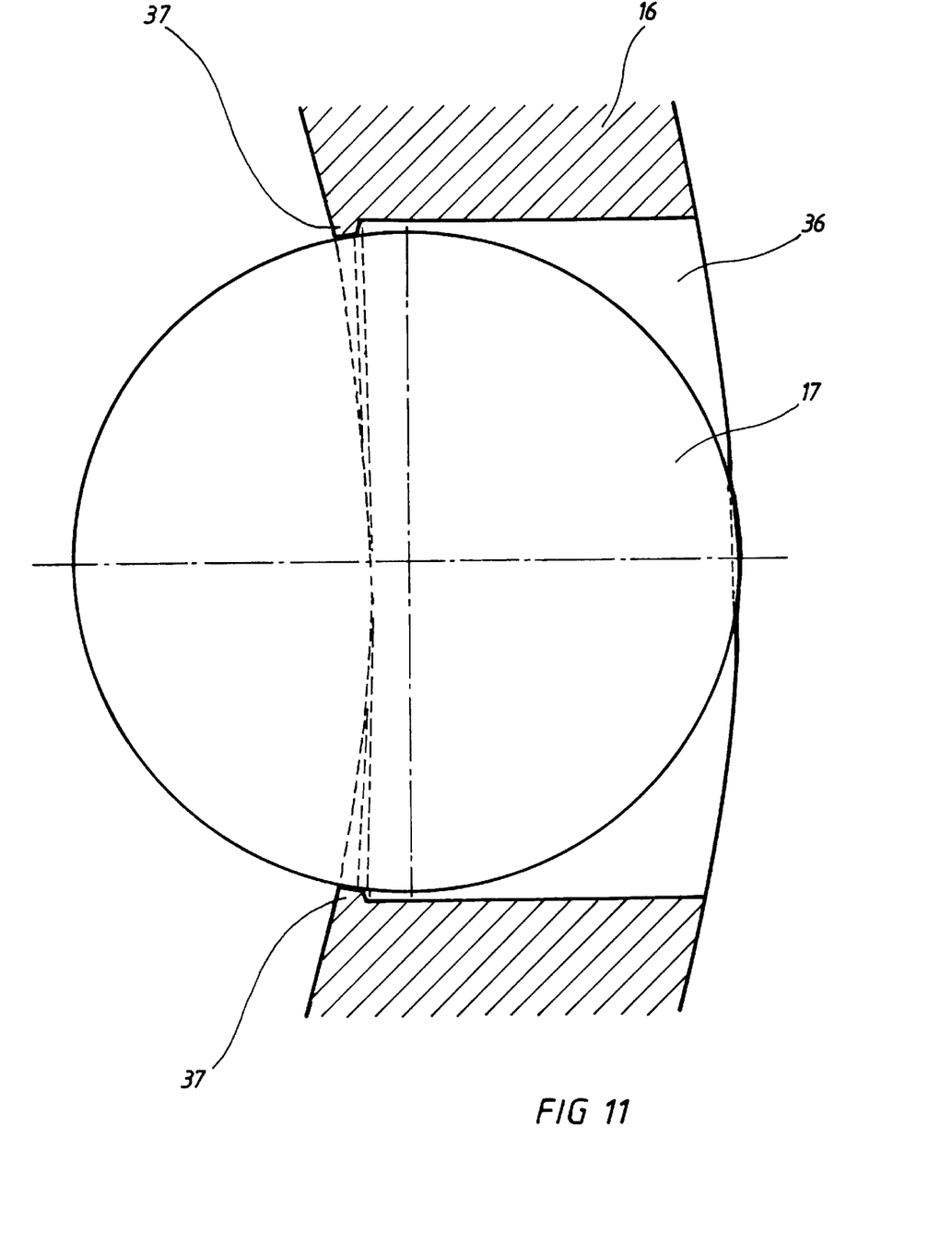
FIG. 11 is a cross section according to XI—XI in FIG. 10.

This ball bearing cage 16 is illustrated once more in enlargement in FIGS. 10 and 11, FIG. 10 showing a vertical section and FIG. 11 a horizontal section. In FIG. 10 the clamped state is shown once more on the left and the unclamped state on the right.

The ball bearing 17 must be prevented from falling inwardly into or out of the ball bearing cage 16. A lug 35 which is flanged all the way round the perimeter of the ball bearing cage 16 prevents the bearing falling out (FIG. 10). Falling inwards is prevented by projections 37. These projections 37 are produced in that the bores 37 in which the ball bearings are accommodated do not extend completely through the ball bearing cage 16. In FIG. 11, eg the cone angle of the drill is illustrated.

The projections 37 are not constructed on the entire perimeter of the bore 36. The reason for this is the curvature of the ball bearing cage 16. The projections 37 exist essentially only in the vertical centre of the ball bearing cage 16 but they suffice to prevent the ball bearings 17 falling out.

FIGS. 12–17 show different fastening variants for the pull-in bolt. For the sake of simplicity the latter is provided throughout with the reference number 3 although various structural shapes are involved. In principle each of these pull-in bolts 3 can be fastened to a pallet or a workpiece. The types of fastening illustrated can also be used in both cases. The fastening of the pull-in bolt 3 is essentially independent of the construction of the quick-clamp cylinder 2. In all the embodiments shown the pull-in bolt 3 is centred in an assigned recess of the pallet 29 or workpiece (not shown).

Figure 12:
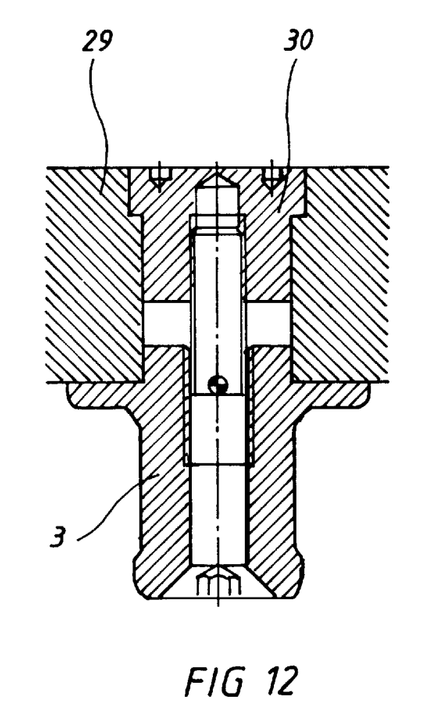
FIGS. 12–17 is different forms of construction and fastenings of pull-in nipples.

The type of fastening shown in FIG. 12 corresponds essentially to that of FIG. 8. The bolt 3 is anchored in the countersupport 30 through a continuous screw 32.

Figure 13:
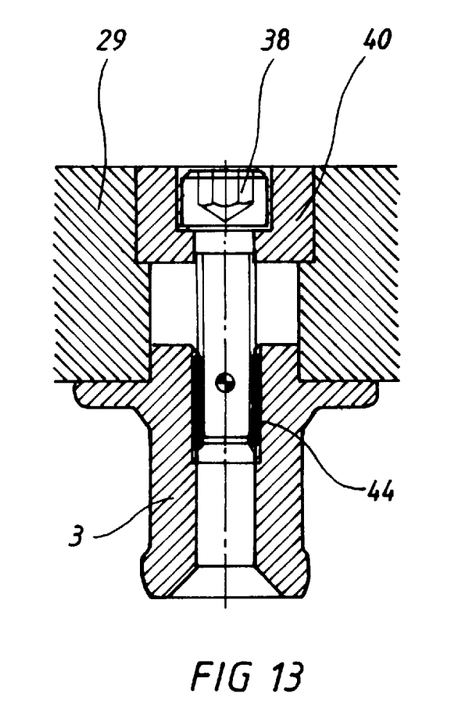
Figure 14:
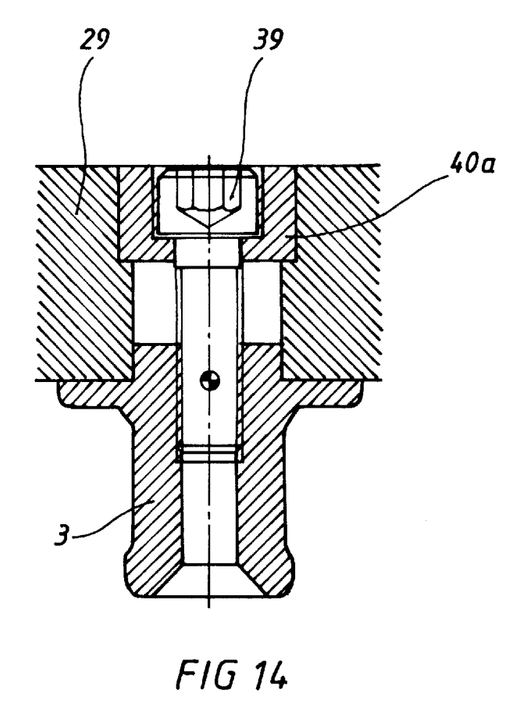

In FIGS. 13 and 14 fastening is done from above through screws 38, 39 which are each supported in an insert 40, 40a. The diameter of the screw 38 is smaller than that of screw 39 so that it is possible to use a helical coil or a threaded insert 44 in order that the same bolt 3 can be used for different screws 38, 39.

Figure 15:
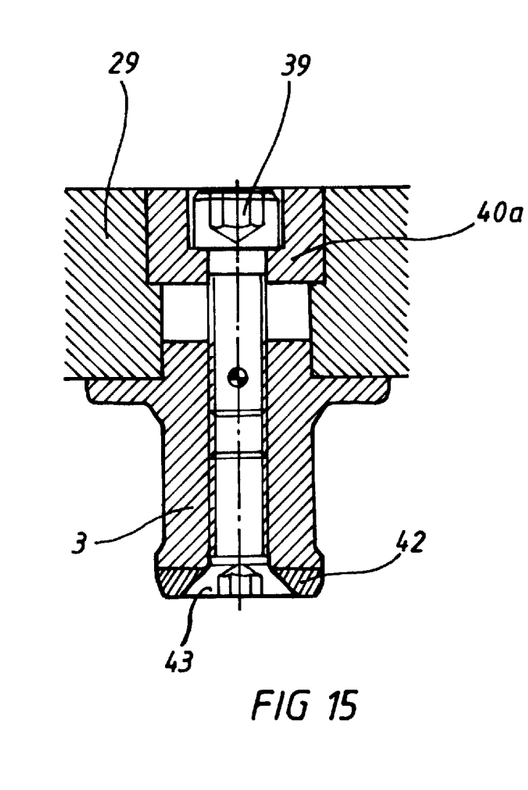

FIG. 15 shows a modified embodiment in which the bolt 3 is held from above through a screw 39 and an insert 40a. Here the bolt 3 is constructed in two parts. It has an extension 42 made of a special material, eg additionally hardened. Fastening is by means of a screw 43.

Figure 16:
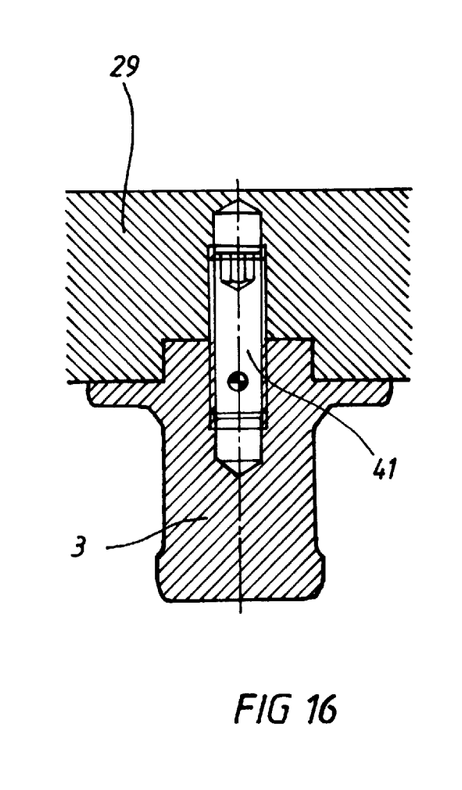
Figure 17:
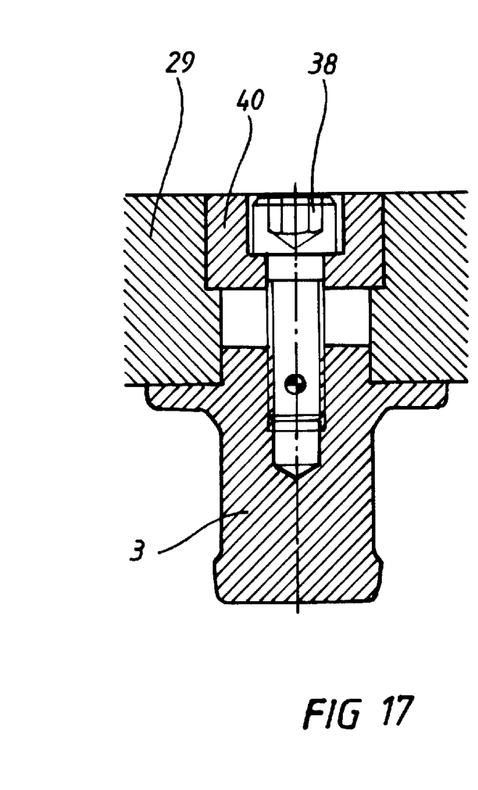

FIGS. 16 and 17 show two bolts 3 in which no through-hole is used. Fastening is either done via a threaded rod 41 (FIG. 16) or as in FIGS. 13, 14 through a screw 38 with an insert 40.

Altogether very much better sealing against liquids, fundamentally simplified fitting and maintenance as well as new possible applications result.

Legend to the drawings
1 Quick-clamp cylinder
2 Lower part
3 Pull-in bolt
4 Tension spring
5 Sealing ring
6 Seeger circlip ring
7 Cover
8 O-ring
9 Hydraulic piston 10 O-ring
11 Central bore
12 Undercut
13 Screw
14 Annular flange
15 O-ring
16 Ball bearing cage
17 Ball bearing
18 Feed line
19 Oil supply device
20 Pressure chamber
21 Seeger circlip ring
22 Groove
23 Groove
24 Annular space
25 Through-hole
26 Circumferential groove
27 Side edge
28 Chamfer
29 Pallet
30 Countersupport
31 Bore
32 Screw
33 Annular groove
34 Damping element
35 Lug
36 Bore
37 Projection
38 Screw
39 Screw
40 Insert
41 Threaded rod
42 Extension
43 Screw
44 Threaded insert

I claim:

1. Device for detachable fastening of workpieces to be machined on a processing machine having a pallet on which the workpieces are detachably fastened, and which can be connected detachably via this pallet to the processing machine, wherein the locking between the pallet and one or more quick-clamp cylinders is effected through at least one pull-in bolt, which cylinders are fastened on the pallet and engage in clamping manner in corresponding receptacles on the quick-clamp cylinder, and wherein the clamping connection is maintained through tension springs, and can be actuated for unlocking a hydraulic piston which overcomes the clamping force of the tension springs, and sealing means for sealing a space between a central pull-in bolt (3) and the tension springs (4) whereby the space containing said quick-clamp cylinder is sealed from the space containing said tension springs.

2. Device according to claim 1, wherein for sealing the space a central sealing ring (5) is arranged in the quick-clamp cylinder (1) which is protected upwardly against axial displacement by a removable lock washer (6) and furthermore has a lock washer (21), which cannot be removed from the quick-clamp cylinder (1), arranged to the side on a downwardly oriented leg of a cover (7) and is supported by its vertically downwardly oriented leg with a further O-ring (10) on the hydraulic piston (9).

3. Device according to claim 2, characterized in that the cover is supported by its downwardly oriented leg on an O-ring arranged on the hydraulic piston and sealing a cover-piston region.

4. Device according to claim 1, characterized in that the cover is supported by its downwardly oriented leg on an O-ring arranged on the hydraulic piston and sealing a cover-piston region.

5. Device according to claim 1, characterized in that a cover of the quick-clamp cylinder is connected detachably by means of screws to the lower part of the quick-clamp cylinder.

6. Device according to claim 1, characterized in that a ball bearing cage supported by an O-ring on the hydraulic piston is provided with ball bearings lodged in an annular space and each resting against an annular groove of the pull-in bolt and the hydraulic piston.

7. Device according to claim 1, characterized in that the pull-in bolt has an annular flange.

8. Device according to claim 1, characterized in that in the quick-clamp cylinder, between a lower part and the hydraulic piston, a pressure chamber is constructed with a feed line having a oil supply device.

9. Device according to claim 1, characterized in that the device is integrated in a machine bench.

10. Device according to claim 1, characterized in that the pull-in bolt is constructed in one or more parts.

11. Device according to claim 1, wherein the pull-in bolt (3) is arranged in a central bore (11) and the tension springs (4) preferably constructed as plate tension springs are arranged in an undercut (12) of the quick-clamp cylinder.

12. Device according to claim 11, characterized in that the undercut can be acted on by a pressure medium to increase the pulling force.

* * * * *